United States Patent [19]

Sibilo et al.

[11] Patent Number: 5,005,947

[45] Date of Patent: Apr. 9, 1991

[54] DEVICE FOR FIXING AN OPTICAL MEMBER SUCH AS A FILTER TO A SUPPORT

[75] Inventors: Gérard Sibilo, Le Plan De Grasse; Michel Louis, Nice, both of France

[73] Assignee: Aerospatiale Societe Nationale Industrielle, Paris Cedex, France

[21] Appl. No.: 413,398

[22] Filed: Sep. 27, 1989

[30] Foreign Application Priority Data

Sep. 30, 1988 [FR] France ............................ 8812812

[51] Int. Cl.$^5$ ............................ G02B 7/02; G02B 7/00
[52] U.S. Cl. ................................ 350/252; 350/318; 350/589
[58] Field of Search ........ 350/242, 245, 248, 251–255, 350/317, 318, 580, 589, 318, 257, 580, 1.6, 1.7, 311, 320, 321, 247, 487, 589

[56] References Cited

U.S. PATENT DOCUMENTS

| | | | |
|---|---|---|---|
| 3,758,200 | 9/1973 | Saito | 350/318 |
| 4,043,646 | 8/1977 | Heine et al. | 350/318 |
| 4,176,916 | 12/1979 | Carpenter | 350/318 |
| 4,302,078 | 11/1981 | Stravitz | 350/318 |
| 4,405,206 | 9/1983 | Ekholm | 350/318 |
| 4,448,000 | 5/1984 | Manuccia et al. | 350/589 |
| 4,492,429 | 1/1985 | Miki et al. | 350/257 |
| 4,536,057 | 8/1985 | Sumi et al. | 350/318 |
| 4,586,787 | 5/1986 | Fiandra et al. | 350/257 |
| 4,610,517 | 9/1986 | Fukino et al. | 350/257 |
| 4,723,833 | 2/1988 | Yamada | 350/253 |
| 4,856,872 | 8/1989 | Spitznas et al. | 350/255 |

FOREIGN PATENT DOCUMENTS

| | | | |
|---|---|---|---|
| 88914 | 5/1985 | Japan | 350/251 |
| 311319 | 12/1988 | Japan | 350/318 |
| 1312507 | 5/1987 | United Kingdom . | |

OTHER PUBLICATIONS

Article from M. S. Maxwell "The Sequential Filter Imaging Radiometer (SFIR) A New Instrument Configuration for Earth Observation" (pp. 245–250) Sep. 1986 Ref. SP-254.

Primary Examiner—Bruce Y. Arnold
Assistant Examiner—Thong Nguyen
Attorney, Agent, or Firm—Pearne, Gordon, McCoy & Gordon

[57] ABSTRACT

For fixing an optical member such as a filter (12) to a support (10), more particularly for performing infrared observations on an artificial satellite, use is made of a device (18) having clamps (20) screwed into the support (10) and whose opposite ends respectively bear on the support and on the filter, a force distribution shim (26) being interposed between each clamp (20) and the filter (12). The tightening force is calibrated by means of one or more elastic washers (28) placed between the head of each fixing screw (22) and the corresponding clamp. Separating strips (24), preferably made from gold, are placed between the filter and the adjacent parts, to the right of shims (26).

7 Claims, 1 Drawing Sheet

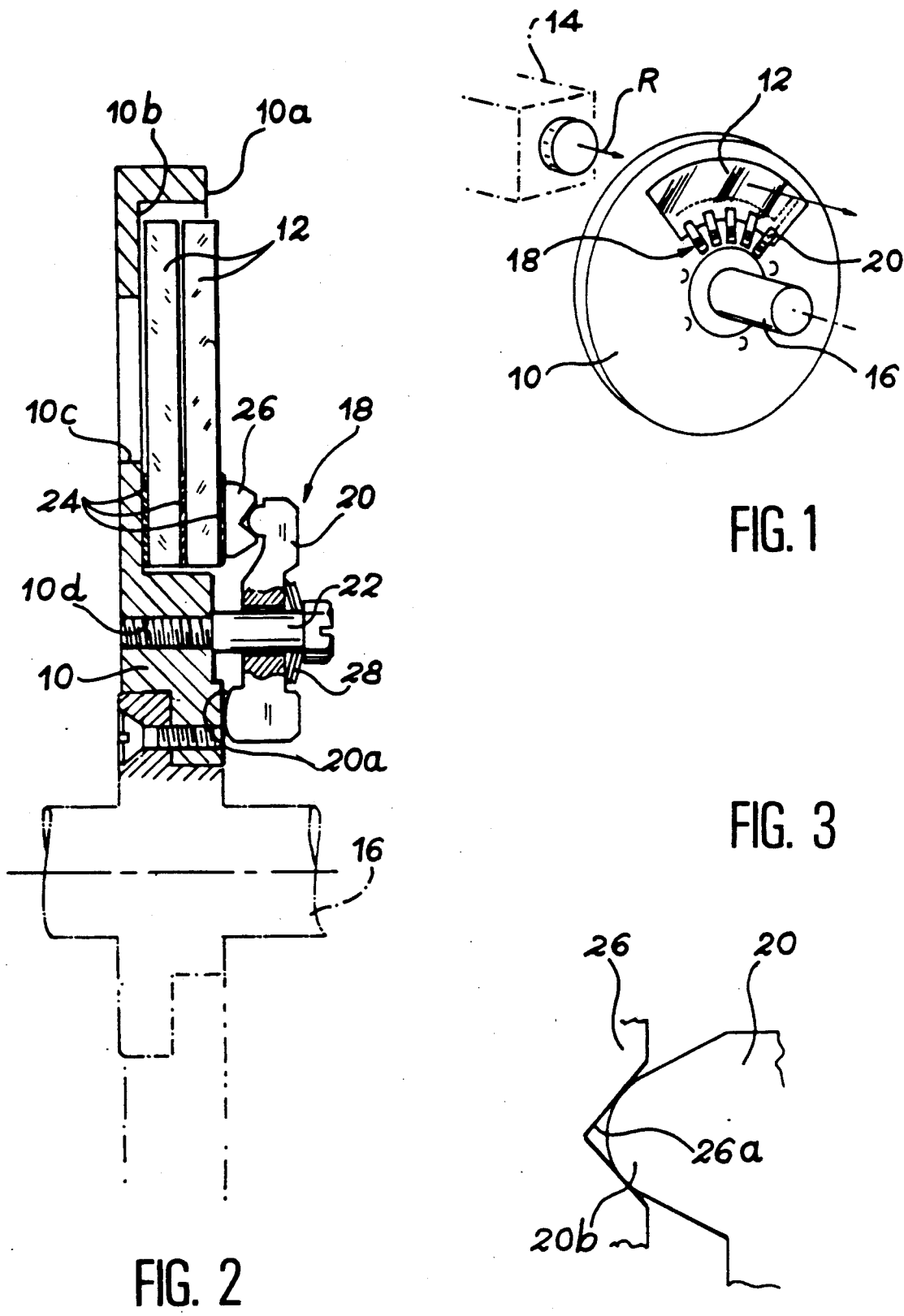

DEVICE FOR FIXING AN OPTICAL MEMBER SUCH AS A FILTER TO A SUPPORT

BACKGROUND OF THE INVENTION

The invention relates to a device making it possible to fix to a support at least one optical member with a relatively small thickness such as a filter, a mirror or a lens, particularly when the use conditions of said member lead to significant temperature variations. Such a fixing device can more particularly be used on an artificial infrared observation satellite for fixing filters equipping an infrared camera to a support.

As a result of the fragility or brittleness of the materials forming the filters (e.g. CdTe, germanium, silicon or $CaF_2$), the conventional fixing devices cannot be used in an application of this type, because the mechanical and thermal stresses to which they are then exposed would lead to the filters becoming deformed or broken.

Thus, infrared observation requires working at a temperature equal to or below 100° K. In view of the fact that the filters are fitted at ambient temperature, i.e. approximately 300° K., the fixing device must subsequently withstand a temperature variation exceeding 200° K. Moreover, the mechanical strength characteristics of the filters requires that the heat gradient within them is kept equal to or below 20° K. during the temperature drop.

Furthermore, like the complete satellite, the optical system is exposed to severe mechanical stressing in the form of vibrations, both when it is at 300° K. and when it is at very low temperatures (which can be close to zero K).

Finally, the choice of the fixing device must also take account, in such an application, of the reduced volume allocated to it on the satellite and the need of ensuring a precise and substantially constant positioning of the filters no matter what the temperature, as well as the earthing of the filters or their covering.

A first fixing procedure known in connection with uses at ambient or close to ambient temperature consists of bonding or glueing the filters to their support. However, the widely differing expansion coefficients between the materials of the filters and the support would, in the case of a use at very low temperature, lead to a deformation or fracture of the filters at the point where they are bonded to their supports. This problem was revealed by tests performed at 4° K. on different adhesive or glue groups. In addition, this solution also does not make it possible to ensure the earthing of the filters or their covering.

Another procedure used at ambient temperature, particularly for fixing lenses in objectives, consists of fixing the filters by means of a ring screwed into a support. However, this solution is also not completely satisfactory, because it is incompatible with the application of a high heat gradient and does not make it possible to ensure a constant tightening. Moreover, the use of a screwed ring may lead to the breaking of the filters under the effect of the relative rotation between the ring and the latter during tightening. Moreover, it significantly increases the overall volume.

A third fixing procedure used at temperatures close to ambient temperature consists of bonding the filter to an annular member, which is rendered integral with the support by bending strips, so as to not induce stresses in the filter. However, this solution also fails to deal with the problem of the bond between the filter and the annular member which it supports.

Therefore all these known devices, which are conventionally used at ambient temperature and for fixing not very fragile optical members, cannot be used when they are exposed to high thermal gradients and when the members which they fix are fragile and have physical characteristics evolving with the temperature.

SUMMARY OF THE INVENTION

The present invention specifically relates to a novel fixing device making it possible to fix to a support at least one fragile or brittle optical member without leading to the deformation or breaking of said member when exposed to a high thermal gradient and having to operate at a very low temperature whilst ensuring a substantially constant, calibrated tightening independently of mechanical and thermal stresses, for a reduced volume and whilst ensuring the earthing of the optical members or their covering.

The invention therefore specifically relates to a device for fixing at least one optical member to a support, characterized in that it comprises at least one clamp, whereof a first end bears on the support and whereof a second end bears on the optical member via a shim, the clamp being traversed between said ends by at least one fixing screw screwed into the support, at least one elastic washer being fitted between the clamp and the screw head, so as to tighten said optical member against the support with a calibrated force, separating strips of a thermally conductive malleable material being interposed between each optical member and the parts of the device against which said member bears.

In the thus realized fixing device, the presence of the separating strips made from a thermally conductive malleable material, such as pure gold, between the optical members and the adjacent parts makes it possible to make good the geometrical defects and eliminate local overstresses, whilst reducing the thermal gradient within the optical member. Moreover, the use of previously calibrated elastic washers makes it possible, as a result of the clearance of the lever arm formed on the flange, to ensure a calibrated tightening of the optical member, as well as a good reproducibility of said tightening.

By applying the tightening force to the optical member via a shim, which preferably cooperates with the second end of the clamp by surfaces defining a swivelling support or bearing, it is possible to ensure an optimum distribution of the tightening pressure over the optical member, which makes it possible to reduce the risk of the latter fracturing.

Moreover, the use of gold separating strips makes it possible, through the deformation of the latter, to make good any geometrical defects between each optical member and the adjacent parts of the device.

According to another aspect of the invention, the support, the screws and the clamps are made from the same material, such as titanium, in order to prevent differential expansions between the different parts of the device, which maintains the tightening pressure independently of the temperature. The use of titanium having a very low expansion coefficient further improves this result and is perfectly adapted to space applications, in view of its low density.

Finally, although the fixing device according to the invention can be used for fixing optical members of any type, such as filters having a random shape, mirrors or lenses, particularly as soon as the operation of the optical system associated with said member requires temperatures far removed from ambient temperature, the invention is advantageously used in the case where the optical member is a circular variable filter or variable circular filter in the form of a ring segment and the support is a wheel having a circular arc slit facing the filter, in such a way that a rotation of the wheel makes it possible to bring different portions of the filter in front of the optical axis of an infrared observation system passing through said slit.

BRIEF DESCRIPTION OF THE DRAWINGS

A preferred embodiment of the invention is described in non-limitative manner hereinafter with reference to the attached drawings, wherein show:

FIG. 1 a very diagrammatically represented perspective view of part of an infrared observation system designed for installation on board an artificial satellite and having circular variable filters mounted on a wheel via a fixing device according to the invention;

FIG. 2 a radial sectional view of part of the wheel of FIG. 1 showing in greater detail the device for fixing filters to said wheel;

FIG. 3 a larger scale view showing the cooPeration between the end of the clamp of the fixing device and the shim interposed between the latter and the filters.

DETAILED DESCRIPTION OF THE DRAWINGS

In the embodiment shown in the drawings, the fixing device according to the invention is used for mounting on a support in the form of a wheel or disk 10 optical filters 12 in the form of ring segments, said filters being used on an infrared camera located on an infrared observation satellite for carrying out spectral analyses.

More specifically, a light ray R from a telescope 14 is oriented towards an experiment on board the satellite through at least one filter 12 and as illustrated in FIG. 1. The filter or filters select the adopted wavelength range and the light signal is then received by a detector (not shown), in which the light intensity of the signal is transformed into an electrical intensity, so that it can be processed by associated electronic circuits.

In the particular case illustrated in the drawings, the ring segment shape of the filters 12 and their fitting to a support in the form of a wheel 10 is explained by the use of circular variable filters (CVF), whose optical properties, i.e. the adopted wavelength range, evolve from one circumferential end to the other. As a function of the experiment performed a not shown stepping motor acting on the axle 16 of the wheel makes it possible to select the adopted wavelength range by placing the corresponding part or portion of the filters on the optical axis of light ray R.

In practice, the CVF are ring segments, whose center angle is close to 90° and whose thickness is very small, generally approximately 2 mm, the inner and outer radii of the filters being approximately 30 mm and approximately 53 mm. As a function of the particular case, the materials constituting these filters are CdTe, germanium, silicon or $CaF_2$. It is common to all these materials that they are very fragile, bearing in mind the limited thickness of the filters.

It is also important to note that infrared observation requires a temperature equal to or below 100° K. Thus, the observation of very low intensity infrared sources makes it necessary to minimize the inherent radiation of the instrument and it is known, that according to the law of Stephan Bolzmann, the intensity of the radiation R is proportional to $T^4$, T being the absolute temperature in degrees K ($R = K\epsilon T^4$, with K : Stephan Bolzmann coefficient and $\epsilon$: infrared emissivity of the surface, $0 \leq \epsilon \leq 1$).

It is therefore necessary on an artificial satellite to provide a cold source, such as a liquid helium reservoir. Thus, the use of superfluid helium makes it possible to attain an operating temperature of 4° K. The complete optical system constituted by the telescope, its optics including the CVF and the associated detectors is thus maintained at 4° K. (hydrogen would make it possible to come even closer to 0° K., but it is dangerous to use).

According to the invention, the filters 12 are fitted to the wheel 10 by an originally designed fixing device 18. Thus, this fixing device is constructed in such a way that it makes it possible to eliminate any risk of deformation or breaking of the filters, despite the particular temperature and mechanical stressing conditions to which they are exposed, particularly by ensuring a calibrated tightening of these filters independent of the temperature.

For this purpose, the fixing device 18 comprises clamps 20, e.g. five such clamps (FIG. 1), which are fixed to the wheel 10 by screws 22, so that their opposite ends respectively bear on wheel 10 and on filters 12, in the vicinity of the inner circumferential edge of the latter.

More specifically, FIG. 2 shows that the wheel 10, which is in the general form of a disk, has on one of its faces 10a at least one recess 10b whose contour corresponds to the contour of the filters 12 and whose depth is e.g. slightly less than the cumulative thickness of the two filters 12 to be placed in said recess. Over the entire length of the recess 10b, a circular arc slit 10c, centered in the same way as the recess 10b on the axis of the wheel, traverse the latter. This slit makes it possible for the light ray R from telescope 14 to reach filters 12, when the latter are fitted in recess 10b.

When the filters 12 are fitted in recess 10b, a preferably gold separating strip 24 is interposed between the bottom of recess 10b and the first filter 12, between the two filters 12 and between the second filter 12 and shims 26 by which each of the clamps 20 hears on the filters. More specifically, bold strips 24 are placed to the right of each of the shims 26, i.e. in an area adjacent to the inner peripheral edges of the filters 12. These gold strips, whose thickness is e.g. close to 0.1 mm, make it possible to make good the geometrical defects of the contacting parts, whilst still ensuring a heat bridge between said parts. The gold strips 24 also earth the filters 12.

As is shown by FIG. 2, each of the clamps 20 is oriented approximately radially with respect to wheel 10 and has a first end, close to the axIs or axle of the wheel which hears on the face 10a of the latter by a convex surface 20a. Moreover, each of the clamps 20 bears on the filters 12 via the corresponding shim 26, by the end thereof furthest from the wheel axis.

More specifically and as illustrated by FIG. 3, said second end of each of the clamps 20 bears on the corresponding shim 26 by surfaces defining a swivel bearing or support. These surfaces are respectively formed on a projecting, circular arc section part 20b of the clamp 20 and in a V section recess 26a in shim 26. The projecting part 20b can be shaped like a half-torus centered on the axis of wheel 10.

Each of the shims 26 is in contact with the second filter 12, via one of the gold strips 24, by a chamfered and deburred, planar face.

When a tightening force is applied to each of the clamps 20 by the corresponding screw 22, the cooperation of the clamp with the shim 26 by a swivel bearing and the particular distribution of said shim ensures an optimum distribution of the tightening pressure over the filters, i.e. a distribution of the tightening pressure over the largest possible surface of the filters. Thus, there is no risk of the filters fracturing during tightening.

Finally, in order to make it possible to carry out said tightening, each of the screws 22 passes through the corresponding clamp 20 approximately equidistantly between the surface 20a and the projecting part 20b by which said clamp respectively bears on wheel 10 and shim 26. Screw 22 is screwed into a tapped hole 10d traversing wheel 10 parallel to its axis, in the vicinity of the inner edge of recess 10b.

According to an essential feature of the invention, one or more elastic washers, such as cupped washers 28, are interposed between the head of each of the screws 22 and the corresponding clamp 20. During tightening of the screws 22, said elastic washers 28 make it possible to calibrate the tightening force exerted on the filters 12 through the clamps 20, by checking the deflection of said washers.

The tightening operation is essential because an excessive or badly distributed tightening would lead to the filters fracturing or deforming, whereas inadequate tightening would lead to the filters slipping.

In practice, this operation is performed in two stages. An initial tightening, checked by measuring the deflection of the washers 28, is firstly carried out starting with the screw 22 closest to the center of the filters and finishing with the screws furthest from the circumferential ends of the filters. In order to take account of the creep of the gold strips 24, a second tightening is performed in the same way roughly 12 hours after the first.

As a result of the arrangement described, which has the auxiliary advantage of occupying a reduced volume it is consequently possible to ensure a calibrated tightening of filters 12 on wheel 10, which makes it possible to ensure the rigidity of the overall system despite variations and a high thermal gradient (from 300 to 4° K.) to which it is exposed. This calibration is obtained by checking the deflection of the elastic washers 28, through knowledge of the lever arm by which the thus exerted tightening force is transmitted to the filters through the clamps 20 and using a tightening procedure taking account of the creep of the gold strips 24. Moreover, the use of the same material such as titanium for producing wheel 10, shims 26, screws 22 and clamps 20 makes it possible to eliminate any differential expansion between said members and, in the case of titanium, gives an overally, very low expansion coefficient. The calibrated tightening obtained during fitting is consequently almost constant, no matter what the temperature.

In summarizing, the fixing device according to the invention makes it possible to obviate differential expansions, i.e. it does not induce any stress on the filters during temperature variations. Any risk of deformation or breaking of said filters is consequently avoided.

Obviously the invention is not limited to the embodiment described in exemplified manner hereinbefore and in fact covers all variants thereof.

Thus, bearing in mind the general characteristics of the fixing device according to the invention and which have just been described, it is clear that such a device is not limited to the fitting of CVF, but can also be used for fixing any fragile optical member having a limited thickness (equal to or below approximately 16 mm), such as circular filters, rectangular filters, mirrors or lenses.

Moreover, the application of this fixing device to installations installed on a satellite is not limitative. Thus, the said device can be used whenever the installation undergoes significant temperature differences and in particular for all infrared observations, even of a terrestrial nature, because these observations make it necessary to operate at temperatures equal to or below 100° K.

Moreover, the actual fixing device can be used for fixing one or more optical devices simultaneously, the number of clamps used being variable as a function of the form or shape of the optical member. Moreover, the dIfferent parts of the assembly can be made from a material other than titanium having a low expansion coefficient and in particular from Invar, especially for terrestrial applications for which it is not necessary to use a low density material. The separating strips can also be made from a different thermally conductive, malleable material, in the case where it is possible to accept inferior mechanical characteristics to those of gold.

We claim:

1. Device for fixing at least one optical member (12) to a support (10), characterized in that it comprises at least one clamp (20), whereof a first end of said clamp bears on the support (10) and whereof a second end of said clamp bears on the optical member (12) via a shim (26), the clamp being traversed between said ends by at least one fixing screw (22) screwed into the support, at least one elastic washer (28) being fitted between the clamp and a head of said screw, so as to tighten said optical member against the support with a calibrated force, said shim along with said optical member and said support providing flat substantially adjacent surfaces, separating strips (24) of a thermally conductive malleable material being interposed along said flat surfaces between said optical member, the support, and the shim, said second end of said clamp (20) and the shim (26) being in contact by surfaces defining a swivel bearing.

2. Device according to claim 1, wherein the second end of the clamp (20) bears on a V-section recess (26a) formed on the shim (26) by a circular arc-section projection (20b).

3. Device for fixing at least one optical member (12) to a support (10), characterized in that it comprises at least one clamp (20), whereof a first end bears on the support (10) and whereof a second end bears on the optical member (12) via a shim (26), the clamp being traversed between said ends by at least one fixing screw (22) screwed into the support, at least one elastic washer (28) being fitted between the clamp and a head of said screw, so as to tighten said optical member against the support with a calibrated force, separating strips (24) of a thermally conductive malleable material being interposed between each optical member, the support, and the shim, and wherein the separating strips (24) are pure gold strips.

4. Device for fixing at least one optical member (12) to a support (10), characterized in that it comprises at least one clamp (20), whereof a first end bears on the support (10) and whereof a second end bears on the optical member (12) via a shim (26), the clamp being traversed between said ends by at least one fixing screw (22) screwed into the support, at least one elastic washer (28) being fitted between the clamp and a head of said screw, so as to tighten said optical member against the support with a calibrated force, separating strips (24) of a thermally conductive malleable material being interposed between each optical member, the support, and the shim, and wherein the support (10), screws (22) and clamps (20) are made from the same material.

5. Device according to claim 4, wherein the support (10), screws (22) and clamps (20) are made from titanium.

6. Device for fixing at least one optical member (12) to a support (10), characterized in that it comprises at least one clamp (20), whereof a first end bears on the support (10) and whereof a second end bears on the optical member (12) via a shim (26), the clamp being traversed between said ends by at least one fixing screw 922) screwed into the support, at least one elastic washer (28) being fitted between the clamp and a head of said screw, so as to tighten said optical member against the support with a calibrated force, separating strips (24) of a thermally conductive malleable material being interposed between each optical member, the support, and the shim, and wherein the optical member is a circular variable filter (12) in the form of a ring segment and the support is a wheel (10) having a circular arc slit (10c) facing the filter, and centered on an axis of rotation of said wheel, whereby different portions of the filter can be brought in front of an optical axis of an infrared observation system traversing said slit, by rotating said wheel around said axis of rotation.

7. Device according to claim 6, wherein several clamps (20) bear on the filter (12) in the vicinity of an inner edge of the latter.

* * * * *